(12) United States Patent
Dokken et al.

(10) Patent No.: US 12,406,593 B2
(45) Date of Patent: Sep. 2, 2025

(54) SYSTEM FOR SIMULATING A MARITIME ENVIRONMENT

(71) Applicant: G.M.S. Global Maritime Services Ltd., London (GB)

(72) Inventors: Sverre Dokken, Monaco (MC); Kris Lemmens, Larnaca (CY); Waqas Ahmed Qazi, Islamabad (PK); Jorgen Grindevoll, Sabaneta Antioquia (CO); Alexis Michael, Limassol (CY); Reidulf Maalen, Las Vegas, NV (US); Hans Lennart Cederberg, Norrköping (SE)

(73) Assignee: G.M.S. Global Maritime Services Ltd., London (GB)

( * ) Notice: Subject to any disclaimer, the term of this patent is extended or adjusted under 35 U.S.C. 154(b) by 760 days.

(21) Appl. No.: 17/277,122

(22) PCT Filed: Sep. 19, 2019

(86) PCT No.: PCT/EP2019/075114
§ 371 (c)(1),
(2) Date: Mar. 17, 2021

(87) PCT Pub. No.: WO2020/058380
PCT Pub. Date: Mar. 26, 2020

(65) Prior Publication Data
US 2021/0272468 A1    Sep. 2, 2021

(30) Foreign Application Priority Data

Sep. 19, 2018 (EP) ..................................... 18195510

(51) Int. Cl.
*G09B 9/06* (2006.01)
(52) U.S. Cl.
CPC ................................... *G09B 9/063* (2013.01)

(58) Field of Classification Search
CPC .................................. G09B 9/063; G09B 9/63
(Continued)

(56) References Cited

U.S. PATENT DOCUMENTS

| 2002/0052724 A1* | 5/2002 | Sheridan | G09B 9/05 703/8 |
| 2006/0281052 A1* | 12/2006 | Almas | G09B 9/048 434/29 |

(Continued)

OTHER PUBLICATIONS

Philipp Last et al.; "Generating Real-Time Objects for a Bridge Ship-Handling Simulator Based on Automatic Identification System Data"; Simulation Modelling Practice and Theory, vol. 72, Mar. 1, 2017 (Mar. 1, 2017), pp. 69-87, XP055570999, Amsterdam, NL.

(Continued)

*Primary Examiner* — Dmitry Suhol
*Assistant Examiner* — Alyssa N Brandley
(74) *Attorney, Agent, or Firm* — Holland & Hart LLP (57) ABSTRACT

The disclosure relates to a system for simulating a maritime environment. The system includes a data duplicator, where an input interface is configured to receive sensor data from a sensor of a maritime vessel, a processor is configured to duplicate the sensor data, a first output interface is configured to provide the sensor data, and a second output interface is configured to provide the duplicated sensor data. The system may also include a training environment simulator, where an input interface is configured to receive the duplicated sensor data, a processor is configured to simulate the maritime environment based on the duplicated senor data, and a display is configured to display a virtual representation of the maritime environment. The system may also include a data processing device, where an input interface is configured to receive the sensor data and a processor is configured to process the sensor data.

17 Claims, 2 Drawing Sheets

(58) Field of Classification Search
USPC .......................................................... 434/29
See application file for complete search history.

(56) References Cited

U.S. PATENT DOCUMENTS

| | | | |
|---|---|---|---|
| 2007/0264617 A1 | 11/2007 | Richardson et al. | |
| 2009/0271054 A1* | 10/2009 | Dokken ................ | G01S 13/937 701/21 |
| 2011/0123960 A1* | 5/2011 | Amdahl .................. | G09B 5/06 434/29 |
| 2013/0282210 A1* | 10/2013 | Kolar ................... | G05D 1/0088 701/21 |
| 2015/0072319 A1* | 3/2015 | Zambare ................ | G09B 9/063 702/9 |
| 2018/0054376 A1 | 2/2018 | Hershey et al. | |

OTHER PUBLICATIONS

Schroeder Greyce et al: "Visualising the Digital Twin Using Web Services and Augmented Reality", 2016 IEEE 14TH International Conference on Industrial Informatics (INDIN), IEEE, Jul. 19, 2016 (Jul. 19, 2016), pp. 522-527.
Gianfranco E. Modoni et al: "A Telemetry-Driven Approach to Simulate Data-Intensive Manufacturing Processes", Procedia CIRP, vol. 57, Jan. 1, 2016 (Jan. 1, 2016), pp. 281-285, XP055571836, NL.
Wikipedia; "Automatic Identification System"; Apr. 20, 2020; 12 pgs.; (Old version, edited by 217.35.97.23 (talk) at 8:45; Jul. 17, 2018).

\* cited by examiner

Fig. 1

SYSTEM FOR SIMULATING A MARITIME ENVIRONMENT

CROSS-REFERENCE TO RELATED APPLICATIONS

The present application is the national phase entry under 35 U.S.C. 371 of International Patent Application No. PCT/EP2019/075114 by Dokken et al., entitled "A SYSTEM FOR SIMULATING A MARITIME ENVIRONMENT," filed Sep. 19, 2019, and claims the benefit of European Patent Application No. 18 195 510.5 by Dokken et al., entitled "A SYSTEM FOR SIMULATING A MARITIME ENVIRONMENT," filed Sep. 19, 2018, each of which is assigned to the assignee hereof and is incorporated by reference in its entirety.

FIELD OF THE DISCLOSURE

The present disclosure relates to the field of simulation and graphical visualization, in particular using virtual reality, VR, technology.

BACKGROUND

With new technologies and regulations appearing in the maritime industries, the complexity of the maritime operations has steadily increased. In order to learn how to use such new technologies and to comply with the regulations, mariners need to be trained and pass examinations on a regular basis.

The better a training fits to a real maritime operation, the better is the training. In particular, it is desirable that the training comes as close as possible to reality. Today, mariners may be trained in specific training simulators arranged within specific training facilities that may allow the mariner to learn how to react to a resembled real situation in order to understand how to best take decisions.

The ability for a training simulator to simulate a maritime environment may, however, be limited to the investment in the physical simulator hardware and software. Furthermore, the simulation of the maritime environment may exclusively be based on synthetically generated data representing the maritime environment. Furthermore, such training simulators are costly to produce and to maintain and may frequently need costly software and hardware updates as new technologies and regulations are introduced. In addition, mariners may need to invest travel time associated with travel costs in order to attend such trainings, possibly including travels to the other side of the world.

SUMMARY

Improved techniques for simulating a maritime environment, in particular for training purposes, are described herein.

Improved techniques for simulating a maritime environment are achieved by the features of the independent claims. Further implementation forms are apparent from the dependent claims, the description and the figures.

This disclosure is based on the finding that sensor data of a real sensor or a combination of real sensors of a maritime vessel may be used to provide an improved virtual representation of a maritime environment. The sensor data may be real-time sensor data or near real-time sensor data. A data duplicator may duplicate the sensor data and may provide duplicated sensor data to a training environment simulator, which may simulate the maritime environment based at least in part on the duplicated sensor data. A virtual representation of the maritime environment (e.g. in conjunction with a virtual representation of a user interface and/or a virtual representation of the maritime vessel) may be provided, and may be displayed, e.g., by a virtual reality, VR, display. A user may interact with the training environment simulator using a human-machine input device, e.g., a virtual reality, VR, controller.

All foregoing and subsequent descriptions equally apply to a maritime platform or a maritime vessel, but also a floating production storage and offloading (FPSO) vessel, a floating storage regasification unit (FSRU) and other storage units and rigs or platforms. The term "maritime infrastructure" as used herein shall refer to any or all such coastal, offshore, moveable or non-moveable maritime assets.

According to a first aspect, the disclosure relates to a system for simulating a maritime environment, the maritime environment being sensed by a sensor of a maritime vessel. The system comprises a data duplicator comprising an input interface, a processor, a first output interface, and a second output interface, wherein the input interface is configured to receive sensor data from the sensor of the maritime vessel, wherein the processor is configured to duplicate the sensor data to obtain duplicated sensor data, wherein the first output interface is configured to provide the sensor data, and wherein the second output interface is configured to provide the duplicated sensor data. The system further comprises a training environment simulator comprising an input interface, a processor, and a display, wherein the input interface is configured to receive the duplicated sensor data, wherein the processor is configured to simulate the maritime environment based at least in part on the duplicated sensor data to obtain a virtual representation of the maritime environment, and wherein the display is configured to display the virtual representation of the maritime environment. The data duplicator is arranged on-board the maritime vessel. The training environment simulator is arranged on-board the coastal or maritime infrastructure.

In an example, the virtual representation of the maritime environment is represented by a plurality of pixels and/or a plurality of voxels. A 'pixel' may represent a location and/or value in 2D space, while a 'voxel' may represent a location and/or value in 3D space. Thus, the virtual representation of the maritime environment may efficiently be displayed. In some examples, the virtual representation may be determined using the available data so as to realistically resemble the real maritime environment and reflect real conditions.

In an example, the system comprises the sensor, wherein the sensor is configured to sense the maritime environment to obtain the sensor data. The sensor is arranged on-board the maritime vessel, and may be configured with the systems of the maritime vessel, so as to efficiently provide the sensor data.

In an example, the sensor comprises a radio detection and ranging device, a laser detection and ranging device, a light detection and ranging device, a sound navigation and ranging device, a thermal sensor device, an infrared sensor device, a multi-spectral sensor device, a hyper-spectral sensor device, a visual band imager, and/or a camera. Thus, the sensor data for the different training scenarios can be provided efficiently using the plurality of sensors that are available.

In an example, the system comprises the sensor, wherein the sensor is further configured to sense a physical parameter associated with the maritime vessel to obtain the sensor data.

The sensor is arranged on-board the maritime vessel. Thus, the sensor data may be provided efficiently.

In an example, the sensor comprises a motion sensor, a speed sensor, a course sensor, a location sensor, a cargo load sensor, an engine power sensor, a shaft power sensor, a fuel consumption sensor, and/or an energy consumption sensor. The sensor may, however, also comprise any other onboard sensor. Thus, the sensor data may be provided efficiently.

In an example, the processor of the data duplicator is configured to convert the duplicated sensor data from a first predetermined sensor data format into a second predetermined sensor data format, wherein the first predetermined sensor data format is associated with the sensor, and wherein the second predetermined sensor data format is associated with the training environment simulator. Thus, a conversion of the duplicated sensor data to be processed by the training environment simulator may be performed efficiently.

In an example, the processor of the training environment simulator is further configured to simulate a user interface within a bridge of the maritime vessel to obtain a virtual representation of the user interface, and wherein the display of the training environment simulator is further configured to display the virtual representation of the user interface. Thus, a perspective from within the bridge of the maritime vessel may be provided efficiently.

In an example, the virtual representation of the user interface is represented by a plurality of pixels and/or a plurality of voxels. Thus, the virtual representation of the user interface may efficiently be displayed. In some examples, virtual representation may be determined so as to realistically resemble a real user interface.

In an example, the virtual representation of the user interface is displayed as an overlay with regard to the virtual representation of the maritime environment. Thus, the virtual representation of the user interface may be displayed efficiently. The virtual representation of the user interface may be semi-transparent.

In an example, the processor of the training environment simulator is further configured to simulate the maritime vessel, in particular a geometric characteristic of the maritime vessel, to obtain a virtual representation of the maritime vessel, wherein the display of the training environment simulator is further configured to display the virtual representation of the maritime vessel. In some examples, geometric characteristic of the maritime vessel may be a geometric shape of the maritime vessel or a volume of a geometric shape of the maritime vessel. Thus, a perspective from outside the bridge of the maritime vessel may be provided efficiently, for example.

In an example, the processor of the training environment simulator is configured to simulate the maritime vessel based at least in part on the duplicated sensor data to obtain the virtual representation of the maritime vessel. Thus, the virtual representation of the maritime vessel may be influenced by sensor data.

In an example, the virtual representation of the maritime vessel is represented by a plurality of pixels and/or a plurality of voxels. Thus, the virtual representation of the maritime vessel may efficiently be displayed. In some examples, the virtual representation may be determined so as to realistically resemble the real maritime vessel.

In an example, the input interface of the training environment simulator is further configured to receive input data from a human-machine input device, wherein the processor of the training environment simulator is configured to simulate the maritime environment further based at least in part on the input data to obtain the virtual representation of the maritime environment. Thus, a user, e.g., a mariner to be trained, may efficiently interact with the training environment simulator, and may efficiently influence the virtual representation of the maritime environment.

In an example, the processor of the training environment simulator is further configured to simulate the user interface within the bridge of the maritime vessel based at least in part on the input data to obtain the virtual representation of the user interface. Thus, a user, e.g., a mariner to be trained, may efficiently interact with the training environment simulator, and may efficiently influence the virtual representation of the user interface.

In an example, the processor of the training environment simulator is further configured to simulate the maritime vessel, in particular the geometric characteristic of the maritime vessel, based at least in part on the input data to obtain the virtual representation of the maritime vessel. Thus, a user, e.g., a mariner to be trained, may efficiently interact with the training environment simulator, and may efficiently influence the virtual representation of the maritime vessel.

In an example, the human-machine input device is a virtual reality, VR, controller. In some examples, the VR controller may include, but not limited to, the use of a joystick, a computer mouse or keyboard, a camera that detects movement, and/or a microphone with voice control options, amongst others. Thus, the input data may be provided intuitively.

In an example, the display of the training environment simulator is a virtual reality, VR, display. Thus, the virtual representation of the maritime environment, the user interface, and/or the maritime vessel may be displayed intuitively.

In an example, the virtual representation of the maritime environment is a three-dimensional, 3D, virtual representation of the maritime environment. Thus, the maritime environment may be displayed as seen from any direction and/or distance by a user, e.g., a mariner to be trained.

In an example, the virtual representation of the user interface is a three-dimensional, 3D, virtual representation of the user interface. Thus, the user interface may be displayed as seen from any direction and/or distance by a user, e.g., a mariner to be trained.

In an example, the virtual representation of the maritime vessel is a three-dimensional, 3D, virtual representation of the maritime vessel. Thus, the maritime vessel may be displayed as seen from any direction and/or distance by a user, e.g., a mariner to be trained.

In an example, the training environment simulator further comprises a communication interface for communicating over a communication network, and wherein the communication interface is further configured to transmit the virtual representation of the maritime environment over the communication network. Thus, the virtual representation of the maritime environment may further be displayed by a remote display. In some examples, the remote display may be arranged at a coastal or another maritime infrastructure.

In an example, the communication interface is further configured to transmit the virtual representation of the user interface over the communication network. Thus, the virtual representation of the user interface may further be displayed by a remote display. In some examples, the remote display may be arranged at a coastal or another maritime infrastructure.

In an example, the communication interface is further configured to transmit the virtual representation of the maritime vessel over the communication network. Thus, the virtual representation of the maritime vessel may further be displayed by a remote display. In some examples, the remote display may be arranged at a coastal or another maritime infrastructure.

In an example, the communication interface is configured to receive further sensor data over the communication network, and wherein the processor is further configured to simulate the maritime environment based at least in part on the further sensor data to obtain the virtual representation of the maritime environment. Thus, further sensor data, e.g., from a sensor of another onboard system or another coastal or maritime infrastructure, may be provided efficiently.

In an example, the communication network is configured to provide online communications via, including but not limited to, the Internet, Maritex, BGAN, VSAT, and/or WIMAX. Thus, the communications via the communication network may be implemented efficiently.

In an example, the sensor data and/or the further sensor data represents a location of an object in the maritime environment, a speed and/or direction of motion of an object in the maritime environment, a water current direction within the maritime environment (which may also be provided by external data providers), a water current speed within the maritime environment (which may also be provided by external data providers), a wind direction within the maritime environment, a wind speed within the maritime environment, a wave direction within the maritime environment, a significant height of a wave within the maritime environment, and/or a temperature within the maritime environment. The sensor data and/or the further sensor data may, however, also represent any other physical parameter within the maritime environment. Thus, sensor data representative of the maritime environment may be used by the training environment simulator.

In an example, the sensor data and/or the further sensor data represents a motion of the maritime vessel, a speed of the maritime vessel, a course of the maritime vessel, a geographic location of the maritime vessel, a cargo loading and/or discharging of the maritime vessel, which may include appropriate cargo care parameters depending on the cargo's behavior (e.g., representing a movement of fluid in a tank while the maritime vessel is sailing or lashing containers in case of bad weather), an engine power of the maritime vessel, a shaft power of the maritime vessel, a fuel consumption of the maritime vessel, and/or an energy consumption of the maritime vessel. These are some examples, but they may be updated in accordance to the user's needs. Thus, sensor data representative of the maritime vessel may be used by the training environment simulator.

In an example, the training environment simulator further comprises a memory configured to store complementary data associated with the maritime environment, and wherein the processor of the training environment simulator is further configured to simulate the maritime environment based at least in part on the complementary data to obtain the virtual representation of the maritime environment. Thus, pre-stored complementary data, which may not be sensed by a sensor, may be used for simulating the maritime environment.

In an example, the complementary data and the sensor data together represent the maritime environment. Thus, the complementary data complements the sensor data in that the virtual representation of the maritime environment is complete.

In an example, the complementary data, the sensor data, and the further sensor data together represent the maritime environment. Thus, the complementary data complements the sensor data and the further sensor data in that the virtual representation of the maritime environment is complete.

In an example, the system further comprises a data processing device comprising an input interface, and a processor, wherein the input interface is configured to receive the sensor data, and wherein the processor is configured to process the sensor data. The data processing device is arranged on-board the maritime vessel. Thus, an existing data processing device of the maritime vessel may be used efficiently.

In an example, the data processing device is a nautical geographic information system, in particular an electronic chart display and information system, ECDIS, or an automatic radar plotting aid, ARPA, system. The data processing device may, however, also be any other onboard system. Thus, the sensor data and the duplicated sensor data may be data as processed by such systems.

In an example, the data processing device is a nautical navigation system, in particular a nautical route planning system or a nautical route optimization system. Thus, the sensor data and the duplicated sensor data may be data as processed by such systems.

In an example, the first output interface and the second output interface of the data duplicator are configured to simultaneously provide the sensor data and the duplicated sensor data. Thus, the data processing device and the training environment simulator may simultaneously be provided with the sensor data and the duplicated sensor data allowing for a concurrent comparison of a maritime operation in the real maritime environment and the simulated maritime environment.

According to a second aspect, the disclosure relates to a method for simulating a maritime environment, the maritime environment being sensed by a sensor of a maritime vessel. The method comprises receiving, by an input interface of a data duplicator, sensor data from the sensor of the maritime vessel, duplicating, by a processor of the data duplicator, the sensor data to obtain duplicated sensor data, providing, by a first output interface of the data duplicator, the sensor data, providing, by a second output interface of the data duplicator, the duplicated sensor data, receiving, by an input interface of a training environment simulator, the duplicated sensor data, simulating, by a processor of the training environment simulator, the maritime environment based at least in part on the duplicated sensor data to obtain a virtual representation of the maritime environment, and displaying, by a display of the training environment simulator, the virtual representation of the maritime environment.

The method may be performed by the system. Further features of the method may directly result from the features and/or the functionality of the system.

According to a third aspect, the disclosure relates to a computer program comprising a program code for performing the method when executed by a system.

The system may be configured to execute the program code.

Aspects of this disclosure may be implemented in hardware and/or software.

BRIEF DESCRIPTION OF THE DRAWINGS

Implementations of the principles described herein are explained with respect to the following figures.

DETAILED DESCRIPTION

Figure 1:
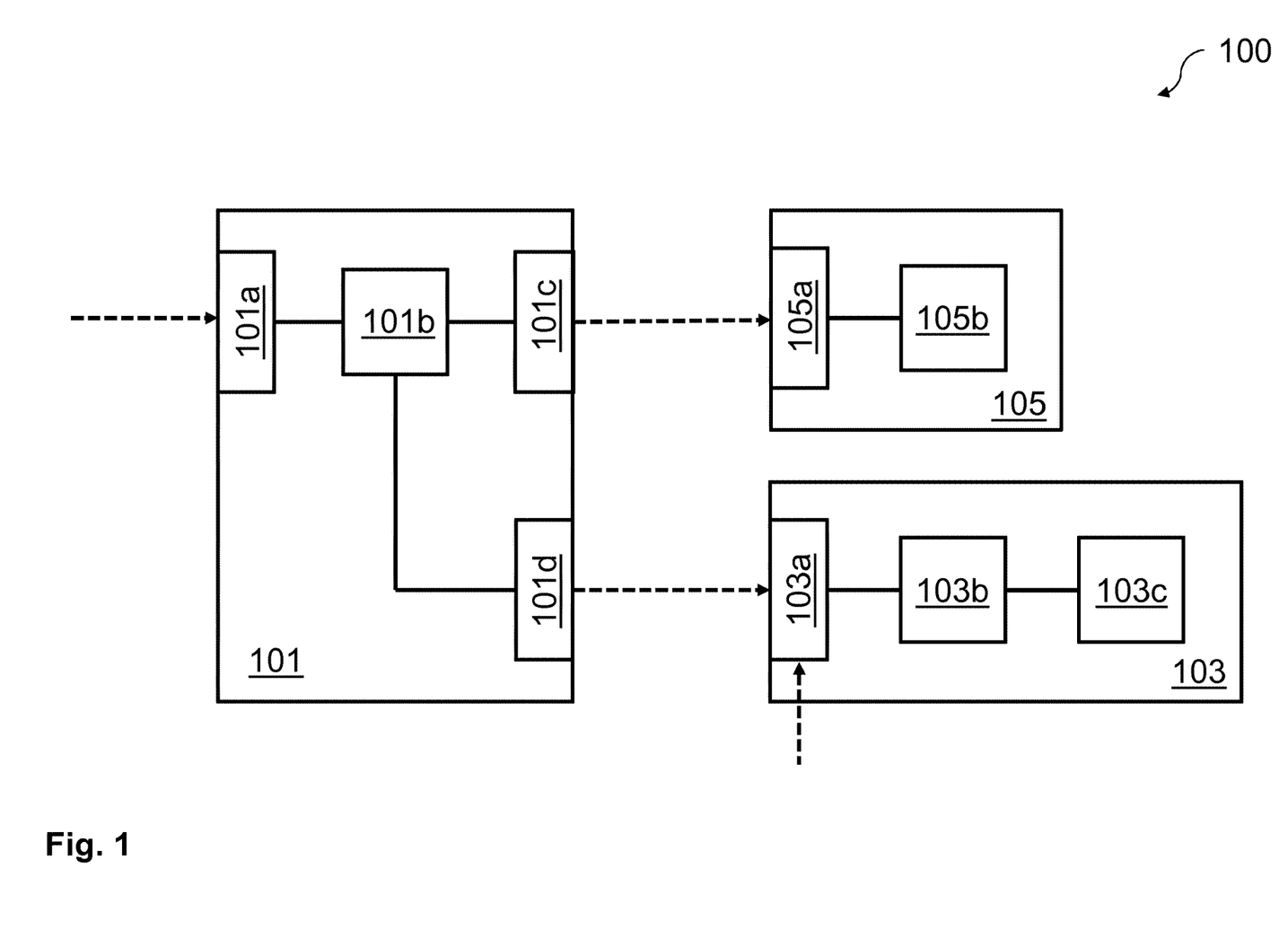
FIG. 1 shows a schematic diagram of a system for simulating a maritime environment.

FIG. 1 shows a schematic diagram of a system 100 for simulating a maritime environment, the maritime environment being sensed by a sensor of a maritime vessel.

The system 100 comprises a data duplicator 101 comprising an input interface 101a, a processor 101b, a first output interface 101c, and a second output interface 101d, wherein the input interface 101a is configured to receive sensor data from the sensor of the maritime vessel, wherein the processor 101b is configured to duplicate the sensor data to obtain duplicated sensor data, wherein the first output interface 101c is configured to provide the sensor data, and wherein the second output interface 101d is configured to provide the duplicated sensor data. The first output interface 101c and the second output interface 101d of the data duplicator 101 may be configured to simultaneously provide the sensor data and the duplicated sensor data.

The system 100 further comprises a training environment simulator 103 comprising an input interface 103a, a processor 103b, and a display 103c, wherein the input interface 103a is configured to receive the duplicated sensor data, wherein the processor 103b is configured to simulate the maritime environment based at least in part on the duplicated sensor data to obtain a virtual representation of the maritime environment, and wherein the display 103c is configured to display the virtual representation of the maritime environment. The sensor data to be processed by the training environment simulator 103 may be categorized in static data, i.e., data of the maritime vessel that may not change, semi dynamic data, i.e., data that may change every time the maritime vessel is in a port and loads new cargo, and dynamic data, i.e., data that may change continuously as the maritime vessel is sailing.

The input interface 103a may further be configured to receive input data from a human-machine input device, wherein the processor 103b may be configured to simulate the maritime environment further based at least in part on the input data to obtain the virtual representation of the maritime environment. The human-machine input device may be a virtual reality, VR, controller. The display 103c may be a virtual reality, VR, display.

The system 100 further comprises a data processing device 105 comprising an input interface 105a, and a processor 105b, wherein the input interface 105a is configured to receive the sensor data, and wherein the processor 105b is configured to process the sensor data. In some examples, the data processing device 105 may be a nautical geographic information system, in particular an electronic chart display and information system, ECDIS, or an automatic radar plotting aid, ARPA, system, or a nautical navigation system, in particular a nautical route planning system or a nautical route optimization system.

The system 100 may allow for a training to be performed using real-time or near real-time sensor data in conjunction with synthetically generated complementary data.

The sensor of the maritime vessel may be an onboard sensor. The sensor may comprise a radio detection and ranging device, a laser detection and ranging device, a light detection and ranging device, a sound navigation and ranging device, a thermal sensor device, an infrared sensor device, a multi-spectral sensor device, a hyper-spectral sensor device, a visual band imager, and/or a camera. The sensor may further comprise a motion sensor, a speed sensor, a course sensor, a location sensor, a cargo load sensor, an engine power sensor, a shaft power sensor, a fuel consumption sensor, and/or an energy consumption sensor. Furthermore, a predetermined sensor data format may be used.

The virtual representations of the maritime environment, the maritime vessel, and a user interface may be in 3D. In some examples, the virtual representations may be represented by a plurality of pixels and/or voxels. The virtual representation of the user interface may be semi-transparent. A mariner may interact with the user interface of the maritime vessel.

A communication interface of the training environment simulator 103 may configured to transmit the virtual representation of the maritime vessel, maritime environment, and/or user interface, over a communication network. The communication network may be configured to provide online communications via, including but not limited to, the Internet, Maritex, BGAN, VSAT, and/or WIMAX.

The sensor data and/or further sensor data may represent a motion of the maritime vessel, a speed of the maritime vessel, a course of the maritime vessel, a geographic location of the maritime vessel, a cargo loading and/or discharging of the maritime vessel, which may include appropriate cargo care parameters depending on the cargo's behavior (e.g., representing a movement of fluid in a tank while the maritime vessel is sailing or lashing containers in case of bad weather), an engine power of the maritime vessel, a shaft power of the maritime vessel, a fuel consumption of the maritime vessel, and/or an energy consumption of the maritime vessel.

The training scenarios may be updated in the future, in accordance with the user's needs. In some examples, the training scenarios may be used for specific learning goals, such as to increase/maintain certain skills and competences, for certification purposes, for example ECDIS, ARPA, NAV STATION, VDR, Dynamic positioning, (DP), Polar navigation, Cargo Care during voyage and others, and/or for a Crew Evaluation System. The training may be undertaken in parallel with the actual operation of the technology by a skilled operator, wherein the two performances may be compared.

Figure 2:
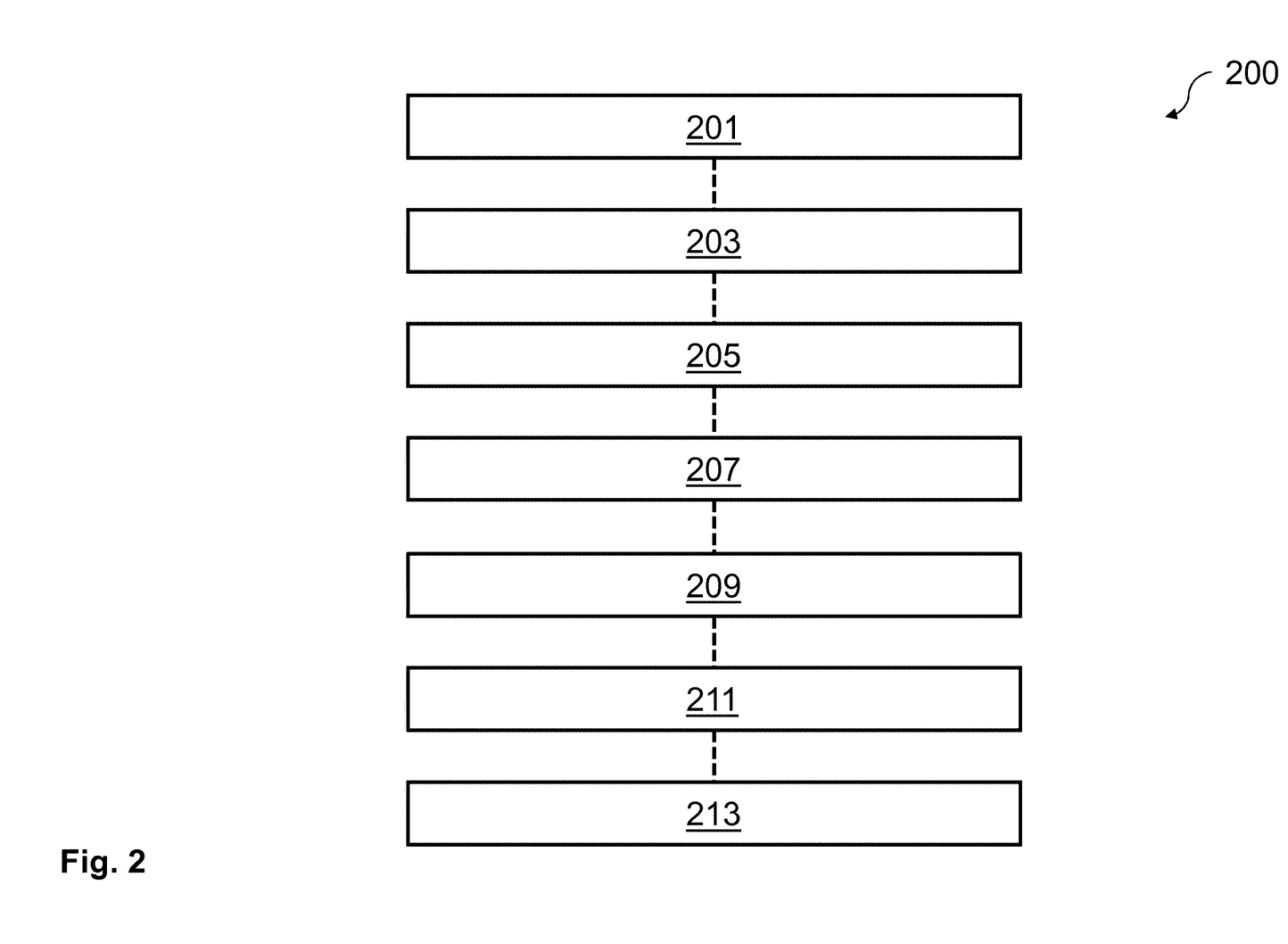
FIG. 2 shows a schematic diagram of a method for simulating a maritime environment.

FIG. 2 shows a schematic diagram of a method 200 for simulating a maritime environment, the maritime environment being sensed by a sensor of a maritime vessel.

The method 200 comprises receiving 201, by an input interface of a data duplicator, sensor data from the sensor of the maritime vessel, duplicating 203, by a processor of the data duplicator, the sensor data to obtain duplicated sensor data, providing 205, by a first output interface of the data duplicator, the sensor data, providing 207, by a second output interface of the data duplicator, the duplicated sensor data, receiving 209, by an input interface of a training environment simulator, the duplicated sensor data, simulating 211, by a processor of the training environment simulator, the maritime environment based at least in part on the duplicated sensor data to obtain a virtual representation of the maritime environment, and displaying 213, by a display of the training environment simulator, the virtual representation of the maritime environment.

The method 200 may be performed by the system. The method 200 may be performed using a computer program comprising a program code. The system may be configured to execute the program code.

The described concept allows for integrating real world and/or real-time sensor data into an interactive training environment for training purposes. Thereby, the usage of a virtual reality, VR, display, e.g., in the form of VR glasses, is facilitated.

The training environment simulator allows for resembling a real-life situation that a mariner is to be trained to handle. It allows for a training of the mariner on-board the actual maritime vessel or another coastal or maritime infrastructure, e.g., while sailing or in port. It equally allows for a training of the mariner onboard a maritime platform while the maritime platform is in use, e.g., an oil production platform. Virtual reality, VR, models of ships, platforms and other objects may be used by the training environment simulator. The system allows for using actual sensor data from the actual maritime vessel, e.g., ship, or maritime platform, to be used in the training, thus not only resembling a real-life situation but being enriched by actual sensor data. Thereby, an actual real-life situation may be shown as it happens for training purposes.

An exemplary training scenario is that a skilled officer may undertake the operations of the actual maritime vessel while the trainee may in parallel and without any actual activation undertake the same operation or a different operation in the virtual environment. Thus, the ability to train on actual sensor data and information in real situations can be achieved without the consequence of unskilled errors that may be expected from a non-skilled person. The training experience may thus be enhanced. Furthermore, the need for costly simulators at training facilities including the need to travel may be reduced.

A further exemplary training scenario includes the use of an ECDIS (Electronic Chart Display Information System), where the trainee can be trained on the actual sensor data used for the ECDIS in an actual situation that the maritime vessel is encountering. Thus, a high-quality representation of the actual situation may be achieved, in contrast to using pure synthetic data for the simulation.

Additional training scenarios may be supported by the system for the training of specific scenarios that a maritime vessel may seldom encounter. Frequent training of mariners may be undertaken since the system may be available on-board of the maritime vessel for refreshment purposes in case a specific skill may need to be refreshed. Refreshment training is performed to improve the skills and competence of mariners, but also to maintain the level of skills and competence already achieved.

The concept allows that mariners no longer need to travel from their maritime vessel to a training facility as to be taught a new technology that has been or will be installed on-board the maritime vessel. The mariner may be trained on actual sensor data that the operator of the maritime vessel is working on in real-time, and not only on synthetic or historical data that may be less relevant, thus achieving a more realistic and thereby valuable training.

The time and frequency as to when and how often a mariner is trained may usually be insufficient as to remember how a technology and all its many functions should be properly used. With added complexity on-board, it may be challenging to remember each technology's proper use. Thus, refreshment trainings can be undertaken frequently since the training equipment may readily be available on-board. The training environment simulator, e.g., including a VR training software, may be updated as often as newer technologies become available, e.g., by means of a communication network connection, for example, using the Internet each time a maritime vessel visits a new port, or even through physical media, e.g., a CD-ROM, a USB or a memory stick, amongst others.

Existing on-board devices may be upgraded over time with new user interfaces and functions that may cause risk of misuse due to non-familiarization of the mariner. By allowing the system to receive updates, the trainee can always train and experiment with any new technology as to experiment first in the virtual environment before acting in the real operational environment, thus leading to a reduced risk of misuse.

Thus, a trainee can learn from a skilled operator who operates the maritime vessel in parallel with the trainee by means of comparing the performances of the skilled operator and the trainee. A skilled operator may also learn alternative ways of utilizing a technology by use of virtual environments to find new and more efficient or more safe ways of operations. Furthermore, the time and cost of travelling from the maritime vessel to a costly training facility somewhere on the globe may be saved.

In particular by using VR technology, e.g., a VR display in form of VR glasses and/or a VR controller, which includes but is not limited to the use of a joystick, a computer mouse or keyboard, a camera that detects movement or a microphone with voice control options amongst others, in conjunction with real-time actual sensor data from a sensor, the maritime environment may be simulated in a direct or augmented way, in order to obtain a virtual representation of the maritime environment to train the mariner of the technology's proper use. In some examples, interfaces may listen to incoming sensor data, and a duplication of the sensor data and transfer of the duplicated sensor data to the training environment simulator may be performed.

The possibility that actual sensor data from the actual maritime vessel may be utilized in the training allows the mariner to be properly trained in how the technology actually in real-time may be used on the maritime vessel on that the mariner will use the technology. In some examples, the mariner will be able, in VR, to learn how the technology may be utilized as well as to actually utilize the technology in order to see how it operates. Since training may be performed in the virtual environment, the consequences of trial-and-error or misuse will be negligible in contrast to training in real scenarios.

Specific learning goals may be targeted. In some examples, training goals may be set according to competence standards. These competence standards may also specify which skills need to be achieved. In some examples, courses may detail what needs to be trained to achieve a specific skill that leads to specific competences that cover the goals. Once achieved, the mariner may be allowed to be examined by an accredited institution as to assess how the mariner accomplishes the learning goals in the virtual environment. How training goals have been achieved may be assessed, e.g., in real-time by the accredited institution by online communication. After passing examinations, the mariner may receive a certification diploma for the technology. In some examples, such diploma may cover skills regarding the use of an Electronic Chart Display and Information System (ECDIS), Dynamic Positioning (DP), or Arctic Navigation, or any other onboard system or technology.

A nautical route planning system or a nautical weather optimization system may exemplarily be used for training purposes. Likewise, any other technology may be used for training purposes, including, but not limited to ECDIS, ARPA, NAV STATION, VDR, Dynamic positioning (DP), Arctic navigation, Cargo Care during voyage and many others.

The data to be processed by the training environment simulator may be categorized in static data, i.e., data of the maritime vessel that may not change, semi dynamic data, i.e., data that may change every time the maritime vessel is in a port and loads new cargo, and dynamic data, i.e., data that may change continuously as the maritime vessel is sailing. The data may further be categorized as data being used either within a specific Graphical User Interface (GUI) developed for a specific operation, or data that is being used within a third-party GUI.

The system may process the same type of data that the technology that the mariner is to be trained on is using. The system may imitate the interface of the actual technology as to have a passive listening interface, i.e., an interface that may only listen to the sensor data traffic but may not interact or stop the sensor data traffic. An additional component on-board may be a data duplicator for duplicating the sensor data of the technology to be trained on. Furthermore, the training environment simulator using the VR technology to be used for the training may be included on-board. The system may further allow a third party to view/examine the mariners training performance by means of an Internet connection, unless an accredited examiner is located on-board. This may be desirable as to have the mariner examined and certified.

Since the training in VR may be undertaken in parallel with the actual operation of the technology by a skilled operator, the two performances can be compared. This may have the benefit that the trainee can directly see how the skilled operator is operating. The system may therefore form part of a CES (crew evaluation system). Thereby, the trainee can compare, assess, analyze, and investigate the difference between the operation of the skilled operator and him-/herself. Using this self-learning procedure through comparison with a skilled operator, it is then easier for the trainee to relate to such similar circumstances while being in the actual operational environment and act in accordance to what the skilled operator may have done. The skilled operator may identify alternative operational ways to perform an operation as to either improve efficiency or increase safety and/or reduce operational risk. This may be done by VR experimentation to see the various consequences of pluralities of options and actions.

In addition, the system can support different training scenarios which can be updated in the future, in accordance to the user's needs. These include, but are not limited to, the following exemplary training scenarios:

For example, VR training for medical training, medical refresher and first aid training onboard a maritime vessel, offshore installation, floating storage/production unit or another coastal or maritime infrastructure. A medical training may be carried out in a virtual environment of an onboard hospital or a first aid case onboard the maritime vessel or offshore installation or another coastal or maritime infrastructure. The training may include, but is not limited to: broken arm, loss of a limb, wire damage where parts of wire have penetrated the skin or human body, impact damage, appendicitis with treatment and operation at sea, storage/inventory of medicines and general housekeeping of onboard hospital, first aid cases MFAG, treatment of patient onboard and the record of such, heart rate and blood pressure monitoring and testing.

Another example is VR training for engine control room operation (ERM—engine recourse management) onboard a maritime vessel, offshore installation, floating storage/production unit or another coastal or maritime infrastructure. Engine control room operation training can be carried out in a virtual environment of an onboard engine control room; the environment can be type specific for the type of vessel or a specific company. This training may include, but not limited to: loss of power (blackout), propulsion/shaft power and loss of such, emergency generator, high voltage training, high voltage switchboard maintenance, IAS (integrated automated system) familiarization, IAS maintenance.

Another example is VR training for cargo control room operation (CCRM—cargo control recourse management) onboard a maritime vessel, offshore installation and/or floating production & storage unit like FPSO, FLNG & FSRU or another coastal or maritime infrastructure. The virtual environment can be type specific for the type of vessel or a specific company. This training may include, but is not limited to: cargo loading, discharging, and ballast operations on oil/chemical tankers and gas carriers. Additional exercises may also include: gas freeing, inerting operations and cow (crude oil washing), FPSO operations and FSRU regasification training. A VR environment with several course attendees carrying out the tasks together in a team where the VR is connected with the other course attendees.

Another example is VR training for bridge operations #1 (BRM—bridge resource management) onboard a maritime vessel, offshore installation and/or floating production & storage unit like FPSO, FLNG & FSRU or another coastal or maritime infrastructure. The virtual environment can be type specific for the type of vessel or a specific company. This training may include, but is not limited to: navigation in ocean passages, rivers, channels and type specific areas such as Panama and Suez Canal scenarios with heavy traffic, critical situations, COLREG challenged situations in waters with dense traffic. The expertise on how to keep a well-functioning bridge team and keeping the situation calm during such critical situations. Furthermore: ice navigation, pilotage and tug boat operations when berthing and under tug or guard boat escort.

Another example is VR training for bridge operations #2 (voyage planning and optimization) onboard a maritime vessel, offshore installation and/or floating production & storage unit like FPSO, FLNG & FSRU or another coastal or maritime infrastructure. The virtual environment can be type specific for the type of vessel or a specific company. This training may include, but is not limited to: voyage planning, passage plan making, requirements for port state control and OCIMF vetting requirements. fuel optimization, safe route, voyage optimization, emission awareness and usage of voyage optimization program. Furthermore: voyage planning in all four stages such as appraisal, planning, execution and monitoring as specified in IMO guidelines for voyage planning.

Another example is VR training for drills that needs to be carried out as per STCW (Standard of Training Certification and Watch-keeping), flag state, classification society and OCIMF (Oil Companies International Maritime Forum) onboard a maritime vessel, offshore installation and/or floating production & storage unit like FPSO, FLNG & FSRU or another coastal or maritime infrastructure. The virtual environment can be type specific for the type of vessel or a specific company. This training may include, but is not limited to: fire, water ingress, emergency steering including local steering from steering gear during blackout, abandon ship mustering and launching of survival craft(s), survival in open seas in a raft/lifeboat, oil spill training, enclosed space rescue, man over board situation and the functions of the different crews during such emergency, $CO_2$ and foam extinguishing systems and how to react in case such an incident for the compartment where such medium is used.

Local control of propulsion during blackout or other emergencies disrupting the communication to the bridge. NFU (Non-Follow Up) steering more locally and remotely from bridge/steering gear compartment. How to handle loss of stability and to act correctly and various scenarios of such.

Another example is VR training for GMDSS (Global Maritime Distress Safety System) training that needs to be carried out as per STCW (Standard of Training Certification and Watch-keeping), flag state, classification society and OCIMF (Oil Companies International Maritime Forum) onboard a maritime vessel, offshore installation and/or floating production & storage unit like FPSO, FLNG & FSRU or another coastal or maritime infrastructure. The virtual environment can be type specific for the type of vessel or a specific company. This training may include, but not limited to: refresher training for GMDSS systems that is either type specific or general type, Inmarsat-C/B communication and how to send messages on such a device, MF/HF testing and emergency communication, instruction in different channels and how to best tune the radio, emergency VHF and the use of such with the designated batteries and the limitation of such equipment, Navtex usage and best practices, EPIRB and SART usage and the limitations of such, TELEX usage, limitations & testing in normal use and as in arctic areas where other radio communication is more limited.

Another example is VR training for cruise/passenger training that needs to be carried out as per STCW (Standard of Training Certification and Watch-keeping), flag state, classification society and OCIMF (Oil Companies International Maritime Forum) onboard a maritime vessel, offshore installation and/or floating production & storage unit like FPSO, FLNG & FSRU or another coastal or maritime infrastructure. The virtual environment can be type specific for the type of vessel or a specific company. This training may include, but not limited to: crisis and crown management in an environment with visitors, supernumeraries, travelers, guests and passengers. such situations can be at any location onboard the coastal or maritime infrastructure, how to react in case of panic onboard, how to react and act face to face with an angry passenger, how to guide, how to talk a passenger into staying calm, handling the situation to the best possible content. The scenarios can be chosen by the course attendee and or type specific as required by a shipping company, based on real events/scenarios.

The sensor data may thus be used for training purposes and for scenarios including, but not limited to, medical training, engine control room operation, cargo control room operation, bridge operations, drills that needs to be carried out as per STCW (Standard of Training Certification and Watch-keeping) and GMDSS (Global Maritime Distress Safety System) and cruise/passenger training that needs to be carried out as per STCW. The concept provides for training onboard a maritime vessel, offshore installation, floating storage/production unit or another coastal or maritime infrastructure.

The concept therefore allows for an efficient training of mariners using virtual reality, VR, technology. In particular, the training can be performed from a maritime vessel, offshore installation or another coastal or maritime infrastructure. Furthermore, the training can be performed with guidance and/or supervision being done remotely. Moreover, a user/trainer/supervisor may switch between different sensors according to the specific requirements for a certain training. The whole training may take place online. In case, there may not be a live online supervision, the results of the training may be uploaded and downloaded by a supervisor, e.g., when being on land.

LIST OF REFERENCE NUMBERS

100 System
101 Data duplicator
101a Input interface
101b Processor
101c First output interface
101d Second output interface
103 Training environment simulator
103a Input interface
103b Processor
103c Display
105 Data processing device
105a Input interface
105b Processor
200 Method
201 Receiving
203 Duplicating
205 Providing
207 Providing
209 Receiving
211 Simulating
213 Displaying

What is claimed is:

1. A system for simulating a maritime environment, the maritime environment being sensed by a sensor of a maritime vessel, the system comprising:
  a data duplicator comprising an input interface, a processor, a first output interface, and a second output interface, wherein the input interface of the data duplicator is configured to receive sensor data from the sensor of the maritime vessel, the processor of the data duplicator is configured to duplicate the sensor data to obtain duplicated sensor data, the first output interface is configured to provide the sensor data, and the second output interface is configured to provide the duplicated sensor data; and
  a training environment simulator comprising an input interface, a processor, a display, a communication interface, and a memory, wherein the input interface of the training environment simulator is configured to receive the duplicated sensor data, the processor of the training environment simulator is configured to simulate the maritime environment based at least in part on the duplicated sensor data to obtain a virtual representation of the maritime environment, the display is configured to display the virtual representation of the maritime environment, the communication interface is configured to communicate over a communication network and to receive further sensor data over the communication network, and the memory is configured to store complementary data associated with the maritime environment that together with the duplicated sensor data and the further sensor data represents the maritime environment,
  wherein the processor of the data duplicator is further configured to convert the duplicated sensor data from a first predetermined sensor data format into a second predetermined sensor data format, wherein the first predetermined sensor data format is associated with the sensor, and wherein the second predetermined sensor data format is associated with the training environment simulator,
  wherein the first output interface and the second output interface of the data duplicator are further configured to simultaneously provide the sensor data and the duplicated sensor data to enable a concurrent comparison of a maritime operation in the maritime environment and the virtual representation of the maritime environment, wherein the duplicated sensor data, the further sensor data, the complementary data, or any combination thereof, represents a location of an object in the maritime environment, a speed of motion of the object in the maritime environment, a direction of motion of the object in the maritime environment, a water current direction within the maritime environment, a water current speed within the maritime environment, a wind direction within the maritime environment, a wind speed within the maritime environment, a wave direction within the maritime environment, a significant height of a wave within the maritime environment, and a temperature within the maritime environment, and wherein the processor of the training environment simulator is further configured to simulate the maritime environment based at least in part on the further sensor data and the complementary data to obtain the virtual representation of the maritime environment.

2. The system of claim 1, wherein the processor of the training environment simulator is further configured to simulate a user interface within a bridge of the maritime vessel to obtain a virtual representation of the user interface, and wherein the display of the training environment simulator is further configured to display the virtual representation of the user interface.

3. The system of claim 1, wherein the processor of the training environment simulator is further configured to simulate a geometric characteristic of the maritime vessel to obtain a virtual representation of the maritime vessel, and wherein the display of the training environment simulator is further configured to display the virtual representation of the maritime vessel.

4. The system of claim 1, wherein the input interface of the training environment simulator is further configured to receive input data from a human-machine input device, and wherein the processor of the training environment simulator is configured to simulate the maritime environment further based at least in part on the input data to obtain the virtual representation of the maritime environment.

5. The system of claim 4, wherein the human-machine input device is a virtual reality controller.

6. The system of claim 1, wherein the display of the training environment simulator is a virtual reality display.

7. The system of claim 1, wherein the communication interface of the training environment simulator is further configured to transmit the virtual representation of the maritime environment over the communication network.

8. The system of claim 1, wherein:
the sensor data represents a location of an object in the maritime environment, a speed, direction, or both, of motion of the object in the maritime environment, a wind direction within the maritime environment, a wind speed within the maritime environment, a wave direction within the maritime environment, a significant height of a wave within the maritime environment, a temperature within the maritime environment, or any combination thereof, and
the further sensor data represents the water current direction within the maritime environment, the water current speed within the maritime environment, or any combination thereof.

9. The system of claim 1, further comprising:
a data processing device comprising an input interface and a processor, wherein the input interface of the data processing device is configured to receive the sensor data, and the processor of the data processing device is configured to process the sensor data.

10. The system of claim 9, wherein the data processing device is a nautical geographic information system or an automatic radar plotting aid system, and wherein the nautical geographic information system comprises an electronic chart display and information system.

11. A method for simulating a maritime environment, the maritime environment being sensed by a sensor of a maritime vessel, the method comprising:
receiving, by an input interface of a data duplicator, sensor data from the sensor of the maritime vessel;
duplicating, by a processor of the data duplicator, the sensor data to obtain duplicated sensor data;
converting, by the processor of the data duplicator, the duplicated sensor data from a first predetermined sensor data format into a second predetermined sensor data format, wherein the first predetermined sensor data format is associated with the sensor, and wherein the second predetermined sensor data format is associated with a training environment simulator;
providing, by a first output interface of the data duplicator, the sensor data;
providing, by a second output interface of the data duplicator, the duplicated sensor data simultaneously with the sensor data to enable a concurrent comparison of a maritime operation in the maritime environment and a virtual representation of the maritime environment;
receiving, by an input interface of the training environment simulator, the duplicated sensor data;
receiving, by a communication interface of the training environment simulator, further sensor data;
storing, by a memory of the training environment simulator, complementary data associated with the maritime environment that together with the duplicated sensor data and the further sensor data represents the maritime environment, wherein:
the duplicated sensor data, the further sensor data, the complementary data, or any combination thereof, represents a location of an object in the maritime environment, a speed of motion of the object in the maritime environment, a direction of motion of the object in the maritime environment, a water current direction within the maritime environment, a water current speed within the maritime environment, a wind direction within the maritime environment, a wind speed within the maritime environment, a wave direction within the maritime environment, a significant height of a wave within the maritime environment, and a temperature within the maritime environment;
simulating, by a processor of the training environment simulator, the maritime environment based at least in part on the duplicated sensor data, the further sensor data, and the complementary data to obtain the virtual representation of the maritime environment; and
displaying, by a display of the training environment simulator, the virtual representation of the maritime environment.

12. The method of claim 11, further comprising:
simulating a user interface within a bridge of the maritime vessel to obtain a virtual representation of the user interface; and
displaying the virtual representation of the user interface.

13. The method of claim 11, further comprising:
simulating the maritime vessel to obtain a virtual representation of the maritime vessel, wherein simulating the maritime vessel comprises simulating a geometric characteristic of the maritime vessel; and displaying the virtual representation of the maritime vessel.

14. The method of claim 11, further comprising:

receiving input data from a human-machine input device; and simulating the maritime environment further based at least in part on the input data to obtain the virtual representation of the maritime environment.

15. The method of claim 11, further comprising:

transmitting the virtual representation of the maritime environment over a communication network.

16. The method of claim 11, wherein:

the sensor data represents a location of an object in the maritime environment, a speed, direction, or both, of motion of the object in the maritime environment, a wind direction within the maritime environment, a wind speed within the maritime environment, a wave direction within the maritime environment, a significant height of a wave within the maritime environment, a temperature within the maritime environment, or any combination thereof, and the further sensor data represents the water current direction within the maritime environment, the water current speed within the maritime environment, or any combination thereof.

17. A non-transitory computer-readable medium storing code for simulating a maritime environment, the maritime environment being sensed by a sensor of a maritime vessel, wherein the code comprises instructions executable by a processor to:

receive, by an input interface of a data duplicator, sensor data from the sensor of the maritime vessel;

duplicate, by a processor of the data duplicator, the sensor data to obtain duplicated sensor data;

convert, by the processor of the data duplicator, the duplicated sensor data from a first predetermined sensor data format into a second predetermined sensor data format, wherein the first predetermined sensor data format is associated with the sensor, and wherein the second predetermined sensor data format is associated with a training environment simulator;

provide, by a first output interface of the data duplicator, the sensor data;

provide, by a second output interface of the data duplicator, the duplicated sensor data simultaneously with the sensor data to enable a concurrent comparison of a maritime operation in the maritime environment and a virtual representation of the maritime environment;

receive, by an input interface of the training environment simulator, the duplicated sensor data;

receive, by a communication interface of the training environment simulator, further sensor data;

store, by a memory of the training environment simulator, complementary data associated with the maritime environment that together with the duplicated sensor data and the further sensor data represents the maritime environment, wherein:

the duplicated sensor data, the further sensor data, the complementary data, or any combination thereof, represents a location of an object in the maritime environment, a speed of motion of the object in the maritime environment, a direction of motion of the object in the maritime environment, a water current direction within the maritime environment, a water current speed within the maritime environment, a wind direction within the maritime environment, a wind speed within the maritime environment, a wave direction within the maritime environment, a significant height of a wave within the maritime environment, and a temperature within the maritime environment;

simulate, by a processor of the training environment simulator, the maritime environment based at least in part on the duplicated sensor data, the further sensor data, and the complementary data to obtain the virtual representation of the maritime environment; and display, by a display of the training environment simulator, the virtual representation of the maritime environment.

* * * * *